United States Patent
Wang et al.

(10) Patent No.: US 11,907,148 B2
(45) Date of Patent: Feb. 20, 2024

(54) OCP ADAPTER CARD AND COMPUTER DEVICE

(71) Applicant: INSPUR SUZHOU INTELLIGENT TECHNOLOGY CO., LTD., Jiangsu (CN)

(72) Inventors: Shuming Wang, Jiangsu (CN); Xiangtao Kong, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 194 days.

(21) Appl. No.: 17/789,365

(22) PCT Filed: Sep. 28, 2020

(86) PCT No.: PCT/CN2020/118305
§ 371 (c)(1),
(2) Date: Jun. 27, 2022

(87) PCT Pub. No.: WO2021/169283
PCT Pub. Date: Sep. 2, 2021

(65) Prior Publication Data
US 2023/0047735 A1 Feb. 16, 2023

(30) Foreign Application Priority Data
Feb. 29, 2020 (CN) .......................... 202010132967.0

(51) Int. Cl.
G06F 13/38 (2006.01)
G06F 13/42 (2006.01)
G06F 13/40 (2006.01)
(52) U.S. Cl.
CPC ........ G06F 13/382 (2013.01); G06F 13/4081 (2013.01); G06F 13/423 (2013.01)

(58) Field of Classification Search
CPC .... G06F 13/385; G06F 13/387; G06F 13/382; G06F 13/38; G06F 13/36; G06F 13/1689;
(Continued)

(56) References Cited

U.S. PATENT DOCUMENTS 10,929,320 B1 * 2/2021 Chou ...................... G06F 13/20
2007/0136504 A1 * 6/2007 Wu ...................... G06F 13/4081
710/302
(Continued)

FOREIGN PATENT DOCUMENTS

CN     206147604 U    5/2017
CN     107577628 A    1/2018
(Continued)

OTHER PUBLICATIONS

International Search Report of corresponding PCT application PCT/CN2020/118305, dated Jan. 4, 2021, 6 pages.
(Continued)

*Primary Examiner* — Raymond N Phan
(74) *Attorney, Agent, or Firm* — COOPER LEGAL GROUP, LLC

(57) ABSTRACT

An open compute project (OCP) adapter card and a computer device are disclosed. The adapter card includes an OCP connector, a controller, a selector, and a motherboard connector. The OCP connector is configured to connect to an OCP network interface card (NIC). The controller is configured for bandwidth allocation, in-situ control and power-on/off control of the OCP NIC. The selector gates a single-homed host or a dual-homed host based on working mode configuration information stored in the controller. The motherboard connector is configured to connect to a motherboard device.

20 Claims, 3 Drawing Sheets

(58) Field of Classification Search
CPC ............. G06F 13/4217; G06F 13/4004; G06F 13/4081; G06F 13/4086; G06F 13/409; G06F 13/42; G06F 9/4413
See application file for complete search history.

(56) References Cited

U.S. PATENT DOCUMENTS

| | | | |
|---|---|---|---|
| 2012/0260015 A1* | 10/2012 | Gay | G06F 13/409 |
| | | | 710/301 |
| 2013/0205059 A1 | 8/2013 | Yang | |
| 2014/0286347 A1* | 9/2014 | Kanigicherla | H04L 49/352 |
| | | | 370/401 |
| 2015/0039764 A1 | 2/2015 | Beloglazov et al. | |
| 2015/0215343 A1 | 7/2015 | Itkin et al. | |
| 2017/0161222 A1* | 6/2017 | Dubal | H04L 67/10 |
| 2017/0262396 A1* | 9/2017 | Mundt | G06F 13/409 |
| 2020/0117568 A1* | 4/2020 | Cheng | G06F 11/3037 |

FOREIGN PATENT DOCUMENTS

| | | |
|---|---|---|
| CN | 207408936 U | 5/2018 |
| CN | 108170631 A | 6/2018 |
| CN | 108287803 A | 7/2018 |
| CN | 207752470 U | 8/2018 |
| CN | 109684259 A | 4/2019 |
| CN | 109828933 A | 5/2019 |
| CN | 210639540 U | 5/2020 |
| CN | 111400217 A | 7/2020 |

OTHER PUBLICATIONS

Written Opinion of International Searching Authority of corresponding PCT application PCT/CN2020/118305, dated Jan. 4, 2021, 9 pages.
First Office Action of corresponding CN priority application CN202010132967.0, dated Mar. 5, 2021, 10 pages.

* cited by examiner

OCP ADAPTER CARD AND COMPUTER DEVICE

This application claims priority to Chinese Patent Application No. 202010132967.0, filed to China Patent Office on Feb. 29, 2020 and entitled "OCP Adapter Card and Computer Device", which is hereby incorporated by reference in its entirety.

FIELD

The present application relates to the technical field of computer boards, in particular to an open compute project (OCP) adapter card and a computer device.

BACKGROUND

An OCP is an open source hardware organization initiated by Facebook in cooperation with Intel, Rackspace, Connectingman Sachs, and Arista Networks in 2011. Its mission is to realize scalable computing by means of an open source hardware technology, provide efficient hardware design for servers, memories, and data centers so as to reduce the environmental impacts of the data centers, and be dedicated to innovation for open source contributions of networks, servers, memories, and OpenRack.

An OCP3.0 network interface card (NIC) newly released by the current OCP supports a higher rate, introduces more diverse functions, makes optimized structural improvements, and is more conveniently integrated into various types of server products. The main features are as follows. The rate has been supported to PCIE Gen4.0 16GT/s. Each card is capable of supporting at most 32 lane PCIEs and supporting single host, multi-root complex and multi-host. Different bandwidths may be used in combination as required. Original three groups of board to board connectors are changed into a connecting finger-connector form structurally, whereby the height flattening facilitates heat dissipation.

For various functions provided by the OCP3.0 NIC, various types of servers are available to meet the application requirements of products. According to existing OCP3.0 NIC design schemes, the design of "SFF with Pull Tab" is typically used. A straddle connector is designed on a motherboard, a connecting finger at an NIC side is directly inserted into a motherboard side, and integration into 1U motherboard applications may be feasible in height. In addition, a PCIE x16 form is typically used in terms of PCIE bandwidth, and single host, i.e. a single-host mode, is supported. Since the OCP3.0 NIC already supports a multi-host function, some 2-way motherboard designs also adopt two CPUs to respectively connect two groups of PCIE X8 configurations to realize a dual host function. The application is relatively simplex, and single host/dual host function switching is not supported.

SUMMARY

The present application provides an OCP adapter card and a computer device for solving the problem that an existing OCP adapter card cannot support switching of single-host and dual-host working modes.

In order to achieve the above object, the present application adopts the following technical solutions.

In a first aspect, the present application provides an OCP adapter card. The OCP adapter card includes an OCP connector, a controller, a selector, and a motherboard connector. The OCP connector is configured to connect to an OCP NIC. The controller is configured for bandwidth allocation, in-situ control and power-on/off control of the OCP NIC. The selector gates a single-homed host or a dual-homed host based on working mode configuration information stored in the controller. The motherboard connector is configured to connect to a motherboard device.

Further, the OCP adapter card also includes an IO extension module and a hot-swap button. The IO extension module is configured to support extension of a CPU hot-swap control signal virtual pin port (VPP) (an Intel CPU transmits interfaces for hot-swap PCIE management via SMBus). The hot-swap button is configured for auxiliary control of CPU hot-swap.

Further, the controller is a complex programmable logic device (CPLD).

Further, the IO extension module includes two groups of extension units. The extension units are configured to receive an OCP NIC in-situ signal and a hot-swap button trigger signal transmitted by the CPLD and send the signals to a CPU, and further configured to transmit power-on/off instructions issued by the CPU to the OCP NIC via the CPLD and perform power-on/off control of the OCP NIC.

Further, the motherboard connector includes connectors J1, J2 and J3. The connectors J1 and J3 are connected to a 2-way CPU motherboard side via a slimline cable, and a PCIE signal, a PCIE reference clock PCIE_REFCLK signal and a PE_HP_VPP0/1 hot-swap signal are introduced. The connector J2 is connected to a motherboard by means of a board to board connector, and miscellaneous signals of a CPLD side are respectively connected to a platform controller hub (PCH) and a baseboard management controller (BMC).

Further, the BMC updates firmware (FW) of the CPLD of the adapter card by means of a CPLD_CFG_I2C signal and updates a user flash memory (UFM) area in the CPLD, for configuring a working mode of the OCP NIC.

Further, an OCP_PRSNT signal for notifying the PCH of an in-situ state of the OCP NIC, an OCP_MODE signal for notifying the PCH of a current working mode of the OCP NIC, and an OCP_BIF signal issued by the PCH to the CPLD for the configuration of an internal working mode of the OCP NIC are contained between the PCH and the CPLD.

Further, the CPLD receives a PCIE device reset PERST signal sent by the PCH, and transmits the signal to the OCP NIC via an internal delay to complete the reset of the OCP NIC.

Further, the CPLD enables the OCP NIC to be powered on by means of an AUX_PWR_EN signal and a MAIN_PWR_EN signal, and monitors a power-on state according to an NIC_PWR_GOOD signal.

In a second aspect, the present application provides a computer device. The computer device is provided with the OCP adapter card.

The effects provided in the SUMMARY section are only the effects of embodiments, not all the effects of the present application. One of the above technical solutions has the following advantages or beneficial effects.

According to an adapter board of the present application, information interaction among modules achieves support for single host and dual host functions, and single host and dual host configurations can be switched as required without needing to open a computer case to change cables, thus simplifying the complexity of design for a motherboard interface, allowing more flexible and diversified application, and facilitating multiplexing between a PCIE interface at a motherboard side and other peripherals. A hot-swap control circuit under two corresponding modes is also designed.

BRIEF DESCRIPTION OF THE DRAWINGS

In order to illustrate the technical solutions in the embodiments of the present application or the prior art more clearly, drawings required to be used in the description of the embodiments or the prior art will be briefly introduced below. Apparently, those ordinarily skilled in the art can also obtain other drawings according to these drawings without creative work.

DETAILED DESCRIPTION

Figure 1:
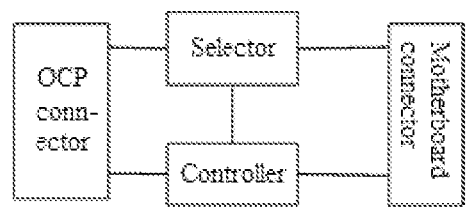
FIG. 1 is a schematic diagram of an adapter card of the present application.

In order to clearly illustrate the technical features of the present solution, the present application will be described in detail below with reference to specific implementations and drawings thereof. The following disclosure provides many different embodiments or examples for implementing different structures of the present application. In order to simplify the disclosure of the present application, components and arrangements of specific examples are described below. In addition, the present application may repeat reference numerals and/or letters in different examples. This repetition is for the purpose of simplicity and clarity and does not dictate a relationship between the various embodiments and/or arrangements discussed. It should be noted that the components illustrated in the drawings are not necessarily drawn to scale. Descriptions of well-known assemblies and processing technologies and processes are omitted in the present application to avoid unnecessarily limiting the present application.

An adapter card of the present application, scalable with an SFF-type OCP3.0 NIC by way of an adapter board, may be installed inside a computer case of 2U or more when equipped with an OCP3.0 NIC. The solution realizes the interconnection with a motherboard PCIE signal via a cable, and designs a CPLD, an IO extension module and a power module on a board to realize switching of single host/dual host functions of the OCP3.0 NIC, hot-swap logic control and support for power supply of the adapter card/OCP3.0 NIC.

As shown in FIG. 1, the adapter card provided by the present application includes an OCP connector, a controller, a selector, and a motherboard connector. The OCP connector is configured to connect an OCP NIC. The controller is configured for bandwidth allocation, in-situ control and power-on/off control of the OCP NIC. The selector gates a single-homed host or a dual-homed host based on working mode configuration information stored in the controller. The motherboard connector is configured to connect a motherboard device. The controller is a programmable logic device such as a CPLD.

Figure 2:
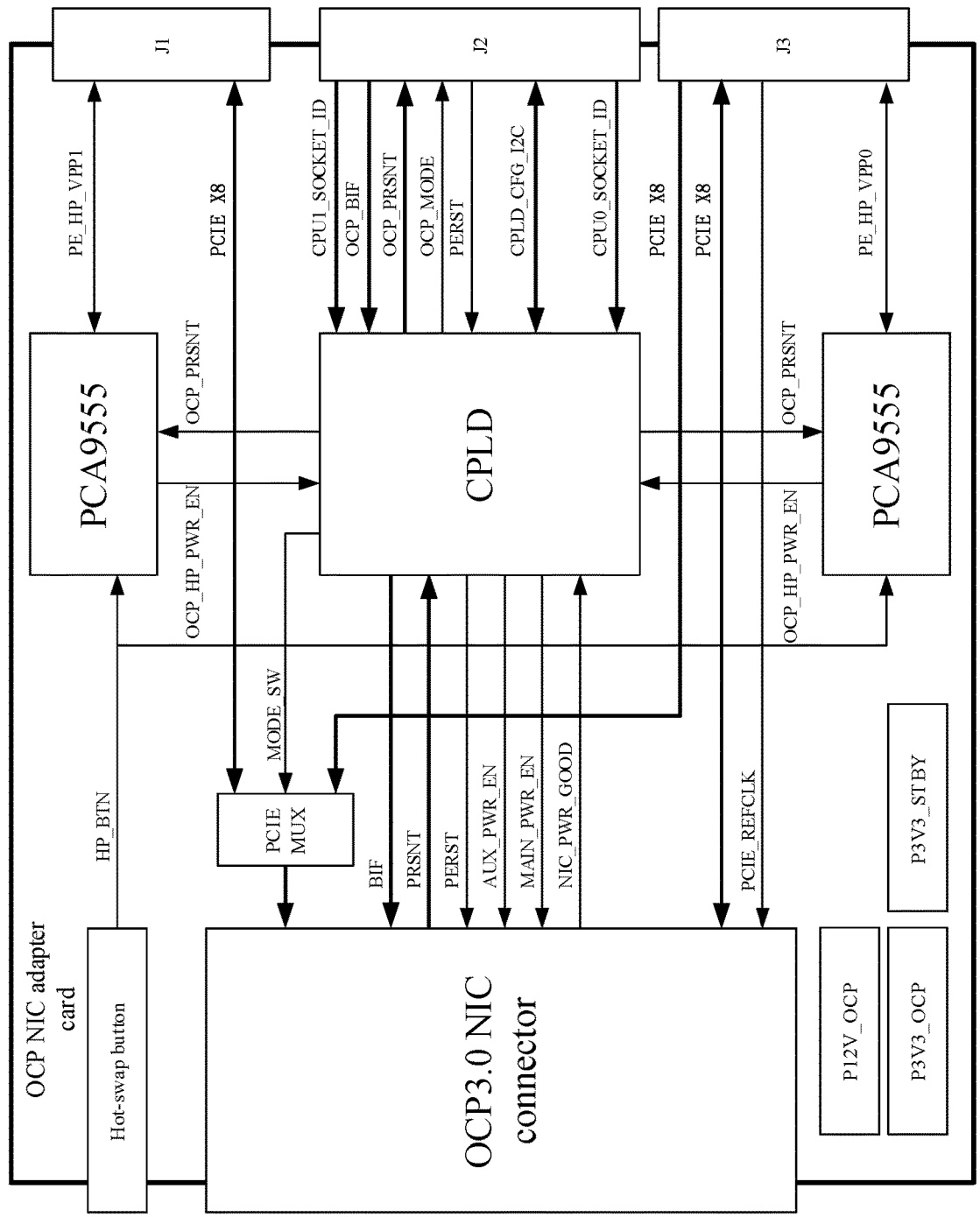
FIG. 2 is a structural diagram of the adapter card of the present application.

As shown in FIG. 2, the adapter card is designed with a straddle connector interface-OCP3.0 NIC connector, which, following an OCP3.0 NIC protocol specification, will support an OCP3.0 NIC in the type of "SFF with Pull Tab". A hot-swap key is designed, and a key and an indicator light are designed according to a PCIE hot-swap specification to assist in realizing a hot-swap function of the OCP3.0 NIC. Three groups of connectors J1/J2/J3 are designed, wherein J1/J3 are slimline connectors to facilitate interconnection with slimline connector ports at a motherboard side via a standard slimline cable, thus facilitating the simplification of PCIE interfaces at the motherboard side and reserving for other functions. The connector J2 is a board to board connector that provides a miscellaneous signal path between the CPLD and the motherboard on the one hand and power access to the adapter card and the NIC on the other hand. Two PCA9555 IO extension modules are designed to support extension of a CPU hot-swap control signal VPP. A PCIE MUX module is designed to realize 1-out-of-2 function, and CPU0 PCIE x8 or CPU1 PCIE x8 is gated respectively according to single host/dual host usage requirements. Three power modules P12V_OCP, P3V3_OCP and P3V3_STBY are designed. P12V_OCP and P3V3_OCP are configured to supply power to the OCP3.0 NIC, and P3V3_STBY is configured to supply power to standbys of the CPLD of the adapter card, an IO chip and the OCP3.0 NIC.

Figure 3:
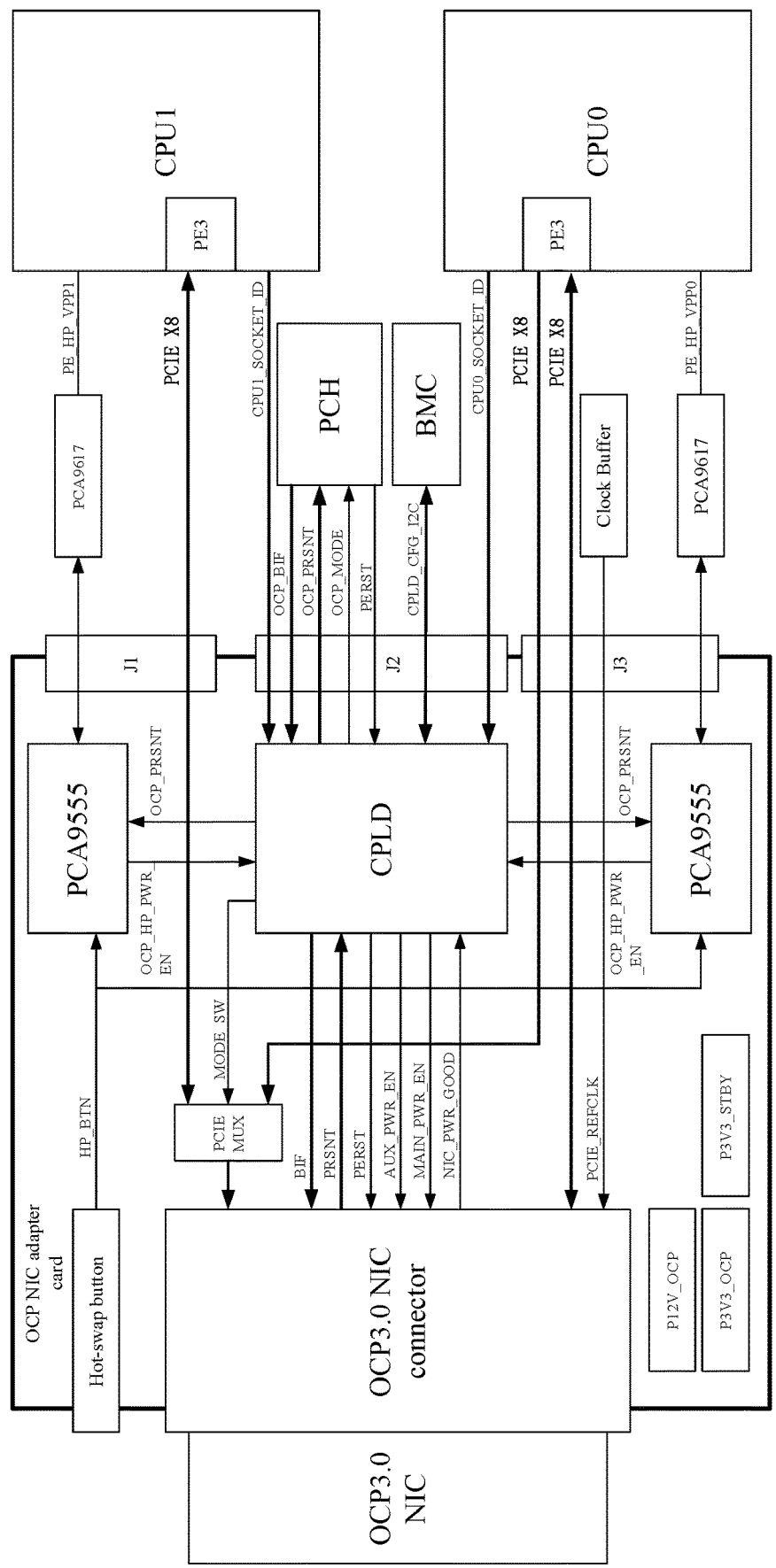
FIG. 3 is a topological diagram of the adapter card of the present application.

As shown in FIG. 3, the OCP3.0 NIC and the adapter card are at the same level wholly, and the NIC is inserted into an OCP3.0 NIC connector of the adapter card via a connecting finger. The connectors J1/J3 are connected to a 2-way CPU motherboard side via a slimline cable, and a PCIE signal, a PCIE reference clock PCIE_REFCLK signal and a PE_HP_VPP0/1 hot-swap signal are introduced. J2 is connected to a motherboard by means of a board to board connector, and miscellaneous signals of a CPLD side are respectively connected to a PCH and a BMC.

The motherboard BMC may update FW of the CPLD of the adapter card by means of a CPLD_CFG_I2C signal. The BMC may also update a UFM area in the CPLD by means of the signal, for configuring a single/dual host working mode of the OCP3.0 NIC. The CPLD gates a PCIE MUX multi-way switch MODE SW signal to select PCIE x8 from either CPU0 or CPU1 according to UFM area data. When PCIE is from CPU0, two groups of PCIE x8 constitute a group of x16, thus achieving a single host mode. When the two groups of PCIE x8 are from CPU0 and CPU1 respectively, the OCP3.0 NIC may work in a dual host mode. Single host/dual host switching is realized in such way without needing to reopen the computer case to reconnect cables.

Three groups of key signals, OCP_PRSNT signal, OCP_MODE signal and OCP_BIF signal, are designed between the CPLD and the PCH. The OCP_PRSNT signal from the CPLD is configured for notifying the PCH of an in-situ state of the OCP3.0 NIC. The OCP_MODE signal from the CPLD is configured for notifying the PCH of a current working mode of the OCP3.0 NIC. The OCP_BIF signal issued by the PCH to the CPLD is used for the configuration of an internal working mode of the OCP3.0 NIC. When the NIC works in a single host mode, the PCIE of the NIC is a complete group of x16 bandwidths. When the NIC works in a dual host mode, the PCIE thereof is two discrete groups of x8 bandwidths. The OCP_MODE signal, the OCP_BIF signal and the single host/dual host mode have matching correspondences.

Two groups of PCA9555 I2C IO extension modules are configured to realize hot-swap control logic. On the one hand, an IO chip PCA9555 receives an in-situ signal OCP_PRSNT of the OCP3.0 NIC and a hot-swap key trigger signal HP_BTN which are transmitted by the CPLD, and notifies a CPU via a level conversion chip PCA9617. On the other hand, a power-on instruction issued by the CPU is transmitted to the CPLD, and the CPLD then controls the OCP3.0 NIC to be powered on and off.

The CPLD monitors the in-situ state of the OCP3.0 NIC by means of the PRSTN signal and transmits OCP_PRSNT to the PCH. The CPLD enables the NIC to be powered on by means of an AUX_PWR_EN signal and a MAIN_PWR_EN signal, and monitors a power-on state according to an NIC_PWR_GOOD signal. The CPLD receives a PCIE device reset PERST signal sent by the PCH, and transmits the signal to the OCP3.0 NIC via an internal delay to complete device reset.

By monitoring CPU0_SOCKET_ID/CPU1_SOCKET_ID signals from the motherboard side, the CPLD is configured to determine whether the CPU is in situ, and a PCA9555 association function of the CPU may be disabled accordingly, whereby it is avoided that when only CPU0 is in situ, the CPLD cannot receive hot-swap control logic from two CPUs, resulting in that the system cannot work.

As described above, the CPLD combines the control logic of the various parts to realize OCP3.0 NIC bandwidth allocation, single host/dual host support, and hot-swap logic control.

Although the specific implementations of the present application have been described above with reference to the accompanying drawings, it is not intended to limit the protection scope of the present application. It will be apparent to those skilled in the art that various modifications or variations made by those skilled in the art without creative work on the basis of the technical solution of the present application still fall within the protection scope of the present application.

What is claimed is:

1. An open compute project (OCP) adapter card, comprising an OCP connector, a controller, a selector, and a motherboard connector, wherein the OCP connector is configured to connect to an OCP network interface card (NIC); the controller is configured for bandwidth allocation, in-situ control and power-on/off control of the OCP NIC; the selector gates a single-homed host or a dual-homed host based on working mode configuration information stored in the controller; and the motherboard connector is configured to connect to a motherboard device.

2. The OCP adapter card according to claim 1, wherein the OCP adapter card further comprises an input/output (IO) extension module and a hot-swap button, wherein the 10 extension module is configured to support extension of a central processing unit (CPU) hot-swap control signal virtual pin port (VPP), and the hot-swap button is configured for auxiliary control of CPU hot-swap.

3. The OCP adapter card according to claim 1, wherein the controller is a complex programmable logic device (CPLD).

4. The OCP adapter card according to claim 1, wherein the OCP adapter card is designed with a straddle connector interface-OCP3.0 NIC connector, which, following an OCP3.0 NIC protocol specification, will support an OCP3.0 NIC in a type of "SFF with Pull Tab".

5. The OCP adapter card according to claim 1, wherein the OCP adapter card is scalable with an small form factor type (SFF-type) OCP3.0 NIC by way of an adapter board.

6. The OCP adapter card according to claim 4, wherein a first power module, a second power module and a third power module are designed, the first power module and second power module are configured to supply power to the OCP3.0 NIC, and the third power module is configured to supply power to standbys of a complex programmable logic device (CPLD) of the OCP adapter card, an input/output (IO) chip and the OCP3.0 NIC.

7. The OCP adapter card according to claim 2, wherein the controller is a complex programmable logic device (CPLD).

8. The OCP adapter card according to claim 2, wherein two PCA9555 IO extension modules are designed to support extension of the CPU hot-swap control signal VPP.

9. The OCP adapter card according to claim 3, wherein an input/output (IO) extension module comprises two groups of extension units, configured to receive an OCP NIC in-situ signal and a hot-swap button trigger signal transmitted by the CPLD and send the OCP NIC in-situ signal and the hot-swap button trigger signal to a central processing unit (CPU), and further configured to transmit power-on/off instructions issued by the CPU to the OCP NIC via the CPLD and perform power-on/off control of the OCP NIC.

10. The OCP adapter card according to claim 3, wherein the motherboard connector comprises a first, second and third connectors wherein the first and third connectors are connected to a 2-way central processing unit (CPU) motherboard side via a slimline cable, and a peripheral component interconnect express (PCIE) signal, a PCIE reference clock (PCIE_REFCLK) signal and a hot-swap signal (PE_HP_VPP0/1 signal) are introduced; and the second connector is connected to a motherboard by means of a board to board connector, and miscellaneous signals of a CPLD side are respectively connected to a platform controller hub (PCH) and a baseboard management controller (BMC).

11. The OCP adapter card according to claim 3, wherein the CPLD enables the OCP NIC to be powered on by means of a first signal (AUX_PWR_EN signal) and a second signal (MAIN_PWR_EN signal), and monitors a power-on state according to a third signal (NIC_PWR_GOOD signal).

12. The OCP adapter card according to claim 10, wherein the BMC updates firmware (FW) of the CPLD of the OCP adapter card by means of a signal (CPLD_CFG_I2C signal) and updates a user flash memory (UFM) area in the CPLD, for configuring a working mode of the OCP NIC.

13. The OCP adapter card according to claim 10, wherein a first signal (OCP_PRSNT signal) for notifying the PCH of an in-situ state of the OCP NIC, a second signal (OCP_MODE signal) for notifying the PCH of a current working mode of the OCP NIC, and a third signal (OCP_BIF signal) issued by the PCH to the CPLD for a configuration of an internal working mode of the OCP NIC are contained between the PCH and the CPLD.

14. The OCP adapter card according to claim 10, wherein the CPLD receives a PCIE device reset signal (PERST signal) sent by the PCH, and transmits the PERST signal to the OCP NIC via an internal delay to complete a reset of the OCP NIC.

15. The OCP adapter card according to claim 11, wherein by monitoring CPU0_SOCKET_ID/CPU1_SOCKET_ID signals from a motherboard side, the CPLD is configured to determine whether the CPU0/1 is in situ, and a PCA9555 association function of a central processing unit (CPU) is configured to be disabled accordingly, whereby it is avoided that in the case where only CPU0 is in situ, the CPLD cannot receive hot-swap control logic from two CPUs, resulting in that a system cannot work.

16. The OCP adapter card according to claim 12, wherein the CPLD gates a PCIE multiplexer (MUX) multi-way switch MODE SW signal to select PCIE x8 from either CPU0 or CPU1 according to user flash memory (UFM) area data, in response to PCIE being from the CPU0, two groups of PCIE x8 constitute a group of x16, thus achieving a single host mode, or in response to the two groups of PCIE x8 being from the CPU0 and the CPU1 respectively, an OCP3.0 NIC is configured to work in a dual host mode.

17. The OCP adapter card according to claim 13, wherein in response to the NIC working in a single host mode, a PCIE of the NIC is a complete group of x16 bandwidths, or in response to the NIC working in a dual host mode, the PCIE thereof is two discrete groups of x8 bandwidths.

18. The OCP adapter card according to claim 17, wherein the OCP_MODE signal, the OCP_BIF signal and the single host/dual host mode have matching correspondences.

19. A computer device, provided with an open compute project (OCP) adapter card comprising an OCP connector, a controller, a selector, and a motherboard connector, wherein the OCP connector is configured to connect to an OCP network interface card (NIC); the controller is configured for bandwidth allocation, in-situ control and power-on/off control of the OCP NIC; the selector gates a single-homed host or a dual-homed host based on working mode configuration information stored in the controller; and the motherboard connector is configured to connect to a motherboard device.

20. A computer device, provided with an open compute project (OCP) adapter card comprising an OCP connector, a controller, a selector, and a motherboard connector, wherein the OCP connector is configured to connect to an OCP network interface card (NIC); the controller is configured for bandwidth allocation, in-situ control and power-on/off control of the OCP NIC; the selector gates a single-homed host or a dual-homed host based on working mode configuration information stored in the controller; and the motherboard connector is configured to connect to a motherboard device, the OCP adapter card further comprising an input/output (IO) extension module and a hot-swap button, wherein the IO extension module is configured to support extension of a central processing unit (CPU) hot-swap control signal virtual pin port (VPP), and the hot-swap button is configured for auxiliary control of CPU hot-swap.

* * * * *